(12) United States Patent
Ueda et al.

(10) Patent No.: US 10,245,787 B2
(45) Date of Patent: Apr. 2, 2019

(54) THREE-DIMENSIONAL PRINTING APPARATUS AND THREE-DIMENSIONAL OBJECT PRINTING METHOD

(71) Applicant: Roland DG Corporation, Hamamatsu-shi, Shizuoka (JP)

(72) Inventors: Jun Ueda, Hamamatsu (JP); Takayuki Sakurai, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 368 days.

(21) Appl. No.: 15/209,924

(22) Filed: Jul. 14, 2016

(65) Prior Publication Data
US 2017/0015058 A1    Jan. 19, 2017

(30) Foreign Application Priority Data
Jul. 15, 2015   (JP) .................................. 2015-141147

(51) Int. Cl.
| | | |
|---|---|---|
| B29C 35/08 | (2006.01) | |
| B29C 64/386 | (2017.01) | |
| B29C 64/135 | (2017.01) | |
| B33Y 10/00 | (2015.01) | |
| B33Y 50/02 | (2015.01) | |

(52) U.S. Cl.
CPC .......... *B29C 64/386* (2017.08); *B29C 64/135* (2017.08); *B33Y 10/00* (2014.12); *B33Y 50/02* (2014.12)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

| | | |
|---|---|---|
| 2002/0155189 A1 | 10/2002 | John |
| 2014/0379114 A1 | 12/2014 | Nakamura |

FOREIGN PATENT DOCUMENTS

| | | |
|---|---|---|
| JP | 2003-039564 A | 2/2003 |
| JP | 2015-007866 A | 1/2015 |

*Primary Examiner* — Ryan M Ochylski
(74) *Attorney, Agent, or Firm* — Keating & Bennett, LLP

(57) ABSTRACT

A three-dimensional printing apparatus includes a projector to project a first image onto a tank and a controller to control the projector. The controller includes an acquirer, an inclination calculator, a vertical and horizontal correction value calculator, a memory, and a corrector. The acquirer projectively transforms the first image, thus acquiring a second image obtained by correction of the first image. The second image includes a projection sub-image. The inclination calculator calculates horizontal and vertical inclinations of the projection sub-image in the second image. The vertical and horizontal correction value calculator calculates a first correction value based on the horizontal inclination, and calculates a second correction value based on the vertical inclination. The memory stores a third correction value. The corrector corrects the brightness distribution of the second image using a fourth correction value calculated based on the first to third correction values.

5 Claims, 11 Drawing Sheets

SPATIAL CODE IMAGE WHOSE CODE VALUE CHANGES HORIZONTALLY

HORIZONTALLY SPACED BOUNDARY LINES

VERTICALLY SPACED BOUNDARY LINES

SPATIAL CODE IMAGE WHOSE CODE VALUE CHANGES VERTICALLY

THREE-DIMENSIONAL PRINTING APPARATUS AND THREE-DIMENSIONAL OBJECT PRINTING METHOD

CROSS REFERENCE TO RELATED APPLICATIONS

This application claims priority to Patent Application No. 2015-141147 filed in Japan on Jul. 15, 2015, the entire contents of which are hereby incorporated by reference.

BACKGROUND OF THE INVENTION

1. Field of the Invention

The present invention relates to three-dimensional printing apparatuses and three-dimensional object printing methods.

2. Description of the Related Art

A three-dimensional printing apparatus known in the art cures a resin material so as to sequentially stack resin material layers each having a predetermined cross-sectional shape, thus printing a desired three-dimensional object. Using cross-sectional shape data indicative of cross-sectional shapes of a three-dimensional object to be printed, such a three-dimensional printing apparatus cures photo-curable resin so as to form resin layers whose shapes conform to the cross-sectional shapes. The three-dimensional printing apparatus sequentially stacks the resin layers conforming to the cross-sectional shapes, thus printing the three-dimensional object.

For example, JP 2003-39564 A discloses a three-dimensional printing apparatus including a tank storing photo-curable resin; a raisable and lowerable holder disposed above the tank; and a projector disposed below the tank and configured to project images. Each image presents a predetermined cross-sectional shape. The projector applies light presenting the cross-sectional shape onto the photo-curable resin in the tank, thus curing a portion of the photo-curable resin in the tank onto which the image is projected (i.e., the light is applied). Changing images to be projected allows curing of an appropriate portion of the photo-curable resin. This enables formation of a resin layer having a desired cross-sectional shape. Sequential raising of the holder allows resin layers to be formed continuously downward. Thus, a desired three-dimensional object is printed.

If an image projected from the projector is distorted in the tank, a resulting resin layer will not accurately conform to a predetermined cross-sectional shape presented by the image. To solve such a problem, JP 2015-7866 A discloses a technique for correcting an image to be projected from a projector so that the image is not distorted in a tank.

If an image projected from the projector is distorted in the tank, the image projected onto the tank will vary in brightness. This means that the image projected may have a large difference between the brightness value of a portion of the image and the brightness value of another portion of the image. Thus, photo-curable resin stored in the tank is cured to varying degrees. In other words, a portion of the photo-curable resin having a low brightness value will not be cured sufficiently. This insufficient curing may degrade the quality of a resulting three-dimensional object. One solution to distortion of an image projected from a projector may be to provide a mechanism to adjust the position and/or orientation of the projector. Unfortunately, providing such a mechanism increases the size of a three-dimensional printing apparatus itself and raises manufacturing costs thereof. The technique disclosed in JP 2015-7866 A does not reduce or eliminate brightness variations of an image projected onto the tank.

SUMMARY OF THE INVENTION

Accordingly, preferred embodiments of the present invention provide a three-dimensional printing apparatus and a three-dimensional object printing method that correct a brightness distribution of an image to be projected from a projector so as to significantly reduce or prevent brightness variations of the image.

A three-dimensional printing apparatus according to a preferred embodiment of the present invention cures liquid photo-curable resin so as to sequentially stack resin layers each having a predetermined cross-sectional shape, thus printing a three-dimensional object. The three-dimensional printing apparatus includes a tank, a projector, and a controller. The tank stores the liquid photo-curable resin. The tank includes a printing region in which the three-dimensional object is to be printed. The projector projects a first image preferably having a quadrangular or substantially quadrangular shape onto the tank. The controller is configured or programmed to control the projector. The controller is configured or programmed to include a matrix calculator, an acquirer, an inclination calculator, a vertical and horizontal correction value calculator, a memory, a corrector, and a projection controller. The matrix calculator calculates a projective transformation matrix by which the first image is projectively transformed so that the first image is presented on an entirety of the printing region. The acquirer transforms the first image using the projective transformation matrix, thus acquiring a second image obtained by correction of the first image. The second image includes a projection sub-image having a quadrangular or substantially quadrangular shape. The inclination calculator calculates a horizontal inclination and a vertical inclination of the projection sub-image in the second image. The vertical and horizontal correction value calculator calculates, based on the horizontal inclination, a first correction value by which a horizontal brightness distribution of the first image is corrected. The vertical and horizontal correction value calculator further calculates, based on the vertical inclination, a second correction value by which a vertical brightness distribution of the first image is corrected. The memory stores a third correction value by which a brightness distribution of the first image projected onto the entirety of the printing region is corrected. The first image projected preferably has a rectangular, substantially rectangular, square or substantially square shape, for example. The corrector corrects a brightness distribution of the second image using a fourth correction value calculated based on the first correction value, the second correction value, and the third correction value. The projection controller controls the projector so that the projection sub-image of the second image whose brightness distribution has been corrected is projected from the projector onto the tank.

If the first image projected from the projector is distorted in the tank, the three-dimensional printing apparatus according to this preferred embodiment of the present invention will correct the first image so that the first image is presented on the entirety of the printing region of the tank. Thus, the second image obtained by correcting the first image is projected from the projector onto the tank. The corrector corrects the brightness distribution of the second image using the fourth correction value. This correction reduces brightness variations of the projection sub-image of the second image to be projected from the projector, thus making uniform or substantially uniform the brightness values of the projection sub-image to be projected onto the tank. Consequently, the three-dimensional printing apparatus according to this preferred embodiment prevents a situation in which portions of the photo-curable resin onto which images are projected are cured to varying degrees. Unlike conventional three-dimensional printing apparatuses, the three-dimensional printing apparatus according to this preferred embodiment of the present invention needs no mechanism to adjust the position and/or orientation of the projector, so that the overall size of the three-dimensional printing apparatus does not increase. Eliminating such a mechanism reduces the number of components and manufacturing cost of the three-dimensional printing apparatus.

Various preferred embodiments of the present invention provide a three-dimensional printing apparatus and a three-dimensional object printing method that correct a brightness distribution of an image to be projected from a projector so as to significantly reduce or prevent brightness variations of the image.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
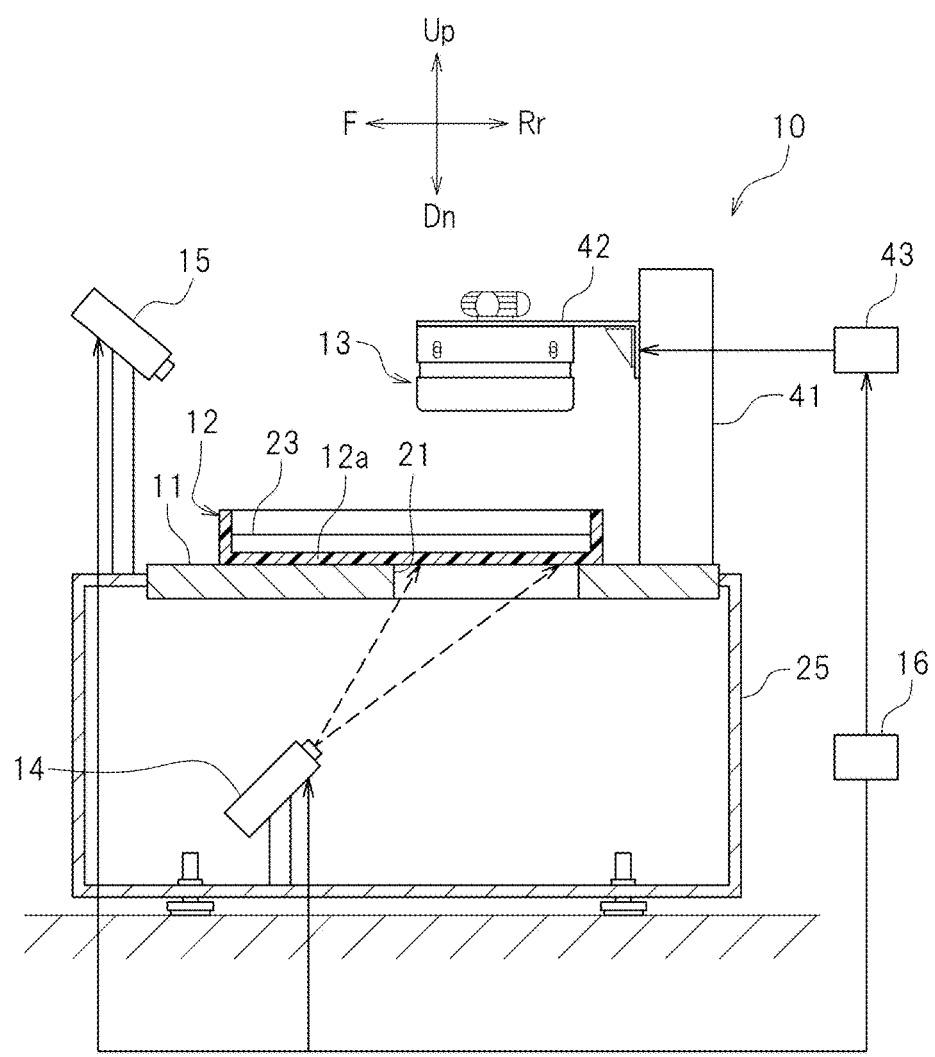
FIG. 1 is a cross-sectional view of a three-dimensional printing apparatus according to a preferred embodiment of the present invention.
Figure 2:
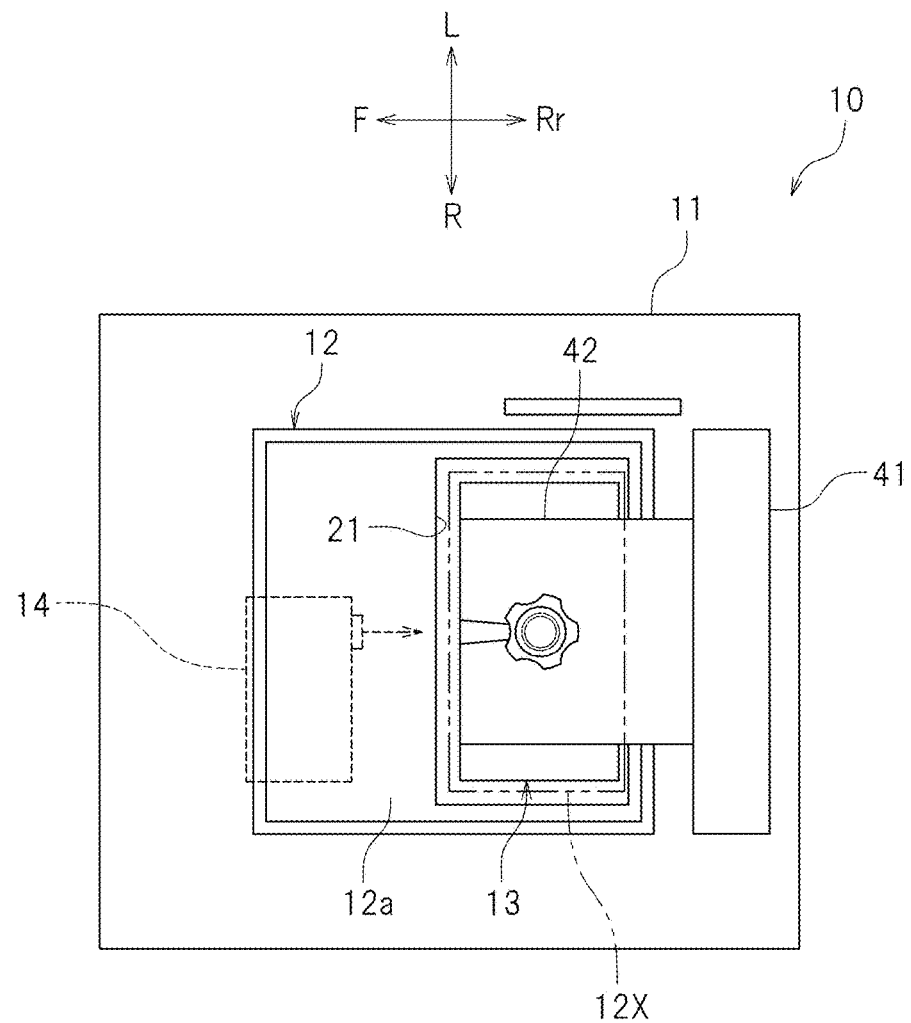
FIG. 2 is a plan view of the three-dimensional printing apparatus according to a preferred embodiment of the present invention.

Three-dimensional printing apparatuses and three-dimensional object printing methods according to preferred embodiments of the present invention will be described below with reference to the drawings. The preferred embodiments described below are naturally not intended to limit the present invention in any way. Components or elements having the same functions are identified by the same reference signs, and description thereof will be simplified or omitted when deemed redundant. FIG. 1 is a cross-sectional view of a three-dimensional printing apparatus 10 according to a preferred embodiment of the present invention. FIG. 2 is a plan view of the three-dimensional printing apparatus 10. The reference signs F, Rr, R, L, Up, and Dn in the drawings respectively represent front, rear, right, left, up, and down. The reference sign X in the drawings represents an X axis extending in a horizontal direction. The reference sign Y in the drawings represents a Y axis extending in a vertical direction. These directions, however, are defined merely for the sake of convenience and thus do not limit in any way how the three-dimensional printing apparatus 10 may be installed.

The three-dimensional printing apparatus 10 is configured to print a three-dimensional object. In accordance with cross-sectional images representing cross-sectional shapes of a three-dimensional object to be printed, the three-dimensional printing apparatus 10 cures liquid photo-curable resin so as to sequentially stack resin layers each having a cross-sectional shape conforming to the associated cross-sectional image, thus printing the three-dimensional object. As used herein, the term "cross-sectional shape" refers to a cross-sectional shape obtained when a three-dimensional object is sliced so that the sliced portions of the three-dimensional object each have a predetermined thickness (e.g., a thickness of about 0.1 mm) in the up-down direction. The term "cross-sectional shape" may also refer to a cross-sectional shape obtained when a three-dimensional object is sliced so that the sliced portions of the three-dimensional object have predetermined different thicknesses in the up-down direction. As used herein, the term "photo-curable resin" refers to resin to be cured by exposure to light of predetermined wavelength(s). The three-dimensional printing apparatus 10 preferably includes a table 11, a tank 12, a holder 13, a projector 14 defining and functioning as a projector, a camera 15 defining and functioning as an image capturing device, and a controller 16.

As illustrated in FIG. 1, the table 11 is supported by a case 25. The table 11 is provided with an opening 21. Light to be applied to photo-curable resin 23 passes through the opening 21.

As illustrated in FIG. 1, the tank 12 stores the photo-curable resin 23 in liquid form. As illustrated in FIG. 2, the tank 12 preferably includes a printing region 12X in which a three-dimensional object is to be printed. The printing region 12X preferably has a rectangular or substantially rectangular shape, for example. Alternatively, the printing region 12X may have a square or substantially square shape, for example. The projector 14 projects a first image 18 (see FIG. 3) and a second image 70 (see FIG. 12) onto the printing region 12X of the tank 12. The first image 18 has a quadrangular or substantially quadrangular shape. The second image 70 (which will be described below) is obtained by correcting the first image 18. The shape and brightness distribution of the second image 70 are corrected. The projector 14 projects the second image 70 onto the printing region 12X so as to print a three-dimensional object. The printing region 12X is located at an interface between a bottom wall 12a (see FIG. 1) of the tank 12 and the photo-curable resin 23. As illustrated in FIG. 2, the tank 12 is placed on the table 11 so as to be attached to the table 11. The tank 12 placed on the table 11 covers the opening 21 of the table 11. The printing region 12X is located inward of the opening 21. The tank 12 is made of a light-transmissive material, such as a transparent material.

As illustrated in FIG. 1, the holder 13 is disposed above the tank 12 and the opening 21 of the table 11. The holder 13 is lowerable such that when the holder 13 is lowered, the holder 13 is immersed in the photo-curable resin 23 in the tank 12. The holder 13 is raisable such that when the holder 13 is raised, the holder 13 lifts portion(s) of the photo-curable resin 23, i.e., resin layer(s), cured by exposure to light. In this preferred embodiment, the table 11 is provided with a support column 41 extending in the up-down direction. A slider 42 is attached to the front portion of the support column 41. The slider 42 is raisable and lowerable along the support column 41. The slider 42 is moved upward or downward by a motor 43. In this preferred embodiment, the holder 13 is disposed in front of the support column 41 and attached to the slider 42. Thus, the holder 13 is moved upward or downward by the motor 43.

Figure 3:
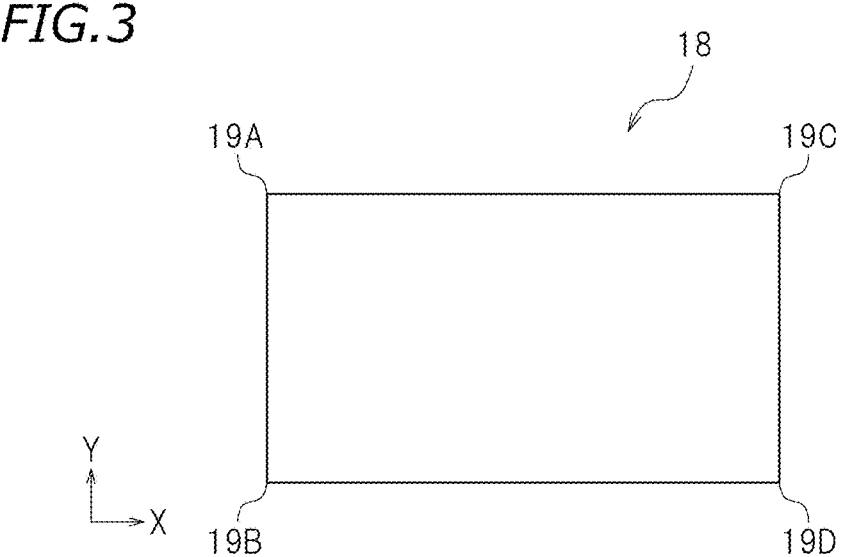
FIG. 3 is a schematic diagram illustrating a first image input to a projector according to a preferred embodiment of the present invention.
Figure 4:
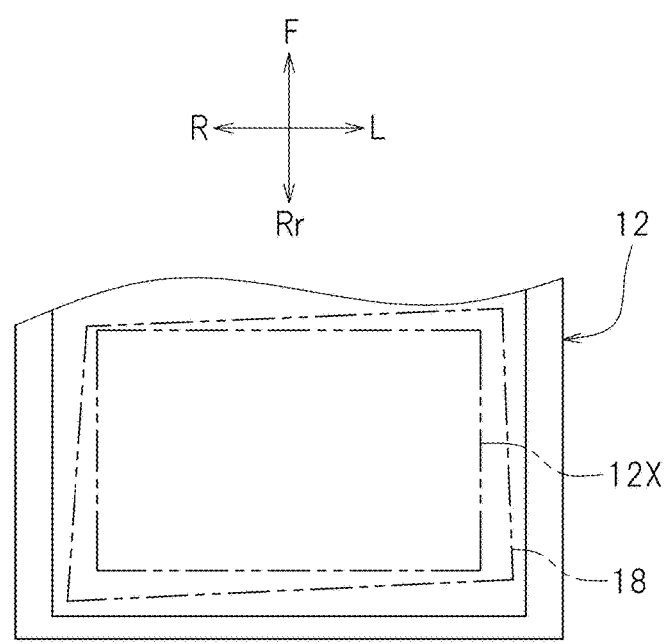
FIG. 4 is a schematic diagram illustrating a portion of a tank according to a preferred embodiment of the present invention.

A signal of the first image 18 (see FIG. 3) and a signal of the second image 70 (see FIG. 12) whose brightness distribution has been corrected are input to the projector 14 from the controller 16. In the following description, the "signal of the first image 18 input to the projector 14" may simply be referred to as the "first image 18 input to the projector 14", and the "signal of the second image 70 whose brightness distribution has been corrected and which is input to the projector 14" may simply be referred to as the "second image 70 input to the projector 14". As illustrated in FIG. 4, the projector 14 projects the first image 18 and the second image 70, whose brightness distribution has been corrected, onto the printing region 12X of the tank 12. The projector 14 applies light of predetermined wavelength(s) onto the printing region 12X, thus projecting the first image 18 and the second image 70, whose brightness distribution has been corrected, onto the printing region 12X. The projector 14 projects the first image 18 and the second image 70, whose brightness distribution has been corrected, onto the interface between the bottom wall 12a of the tank 12 and the photo-curable resin 23. The first image 18 and the second image 70, whose brightness distribution has been corrected, are projected from the projector 14 onto the photo-curable resin 23 in the tank 12 through the opening 21 of the table 11. The first image 18 presented in FIG. 4 is distorted with respect to the printing region 12X.

As illustrated in FIG. 1, the projector 14 is disposed below the tank 12. The projector 14 is housed in the case 25. The projector 14 is inclined with respect to the tank 12. Specifically, the optical axis of the projector 14 is inclined with respect to the bottom wall 12a of the tank 12. As illustrated in FIG. 4, the first image 18 projected from the projector 14 preferably has a quadrangular or substantially quadrangular (e.g., trapezoidal or substantially trapezoidal) shape in the tank 12. In this preferred embodiment, the projector 14 is disposed so that the first image 18 projected from the projector 14 is larger than the printing region 12X and overlaps with an entirety of the printing region 12X.

The first image 18 input to the projector 14 includes a cross-sectional shape obtained by slicing, at predetermined intervals, a three-dimensional object to be printed. The second image 70, whose brightness distribution has been corrected and which is input to the projector 14, is obtained by correcting the first image 18. The controller 16 controls the projector 14 so that the projector 14 sequentially projects the second images 70, whose brightness distribution has been corrected, onto the printing region 12X layer by layer at regular time intervals.

Figure 5:
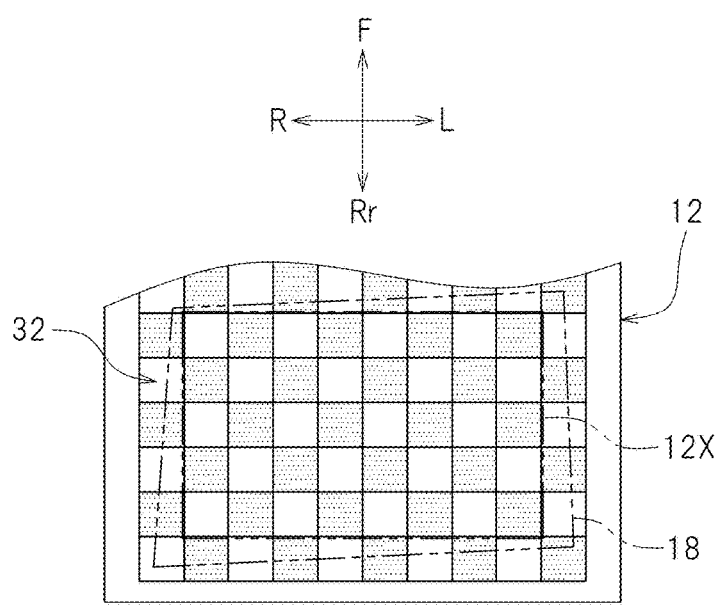
FIG. 5 is a schematic diagram illustrating the tank according to a preferred embodiment of the present invention, with a checkered sheet disposed on the tank.

The camera 15 captures an image of the tank 12 from above the tank 12. The camera 15 preferably includes a lens. The camera 15 is disposed at a position and an orientation that enable the camera 15 to capture an image of an entirety of the tank 12. Specifically, the camera 15 is disposed at a position and an orientation that enable the camera 15 to capture an image of an entirety of the printing region 12X of the tank 12 and an entirety of the first image 18 projected onto the tank 12. The camera 15 captures an image of a checkered sheet 32 (see FIG. 5) disposed on the tank 12. In other words, the camera 15 captures an image of the first image 18 projected onto the checkered sheet 32. The checkered sheet 32 is provided by printing a checkered pattern (or checked pattern) on a material, such as paper, for example, which allows light applied from the projector 14 to pass therethrough. The checkered sheet 32 is larger than the printing region 12X. The checkered sheet 32 is disposed so as to be overlapped with the printing region 12X. The checkered sheet 32 is placed on the tank 12 while calculating a projective transformation matrix H2 (which will be described below). The checkered sheet 32 is not placed on the tank 12 while printing a three-dimensional object. Calibration of the camera 15 itself (which will hereinafter be referred to as "camera calibration" when appropriate) is performed before the camera 15 captures an image of the entirety of the tank 12. The camera calibration involves calculating: internal parameters indicating, for example, a focal length of the camera 15, image center coordinates, a shear factor, and lens distortion; and external parameters indicating the position and orientation of the camera 15 in a three-dimensional space in which the camera 15 is located. The internal parameters and external parameters calculated are stored in a memory 50 (see FIG. 6), which will be described below. Detailed description of how the camera calibration is specifically performed will be omitted, because any conventionally known method may be used to perform the camera calibration.

As illustrated in FIG. 1, the controller 16 is connected to: the motor 43 to raise and lower the slider 42 to which the holder 13 is attached; the projector 14; and the camera 15. The controller 16 drives the motor 43 so as to cause the slider 42 and the holder 13 to move upward or downward. The controller 16 controls the projector 14. Specifically, the controller 16 controls, for example, energy, luminous intensity, amount, wavelength band, and shape of light to be applied from the projector 14, and timing of emission of the light from the projector 14. The controller 16 is not limited to any particular configuration. In one example, the controller 16 may be a computer that includes a central processing unit (CPU), a read-only memory (ROM) storing, for example, a program to be executed by the CPU, and a random-access memory (RAM).

The controller 16 acquires the second image 70 (see FIG. 12), which will be described below. The second image 70 is obtained by correcting the first image 18 so that the first image 18 is presented on the entirety of the printing region 12X. The controller 16 corrects the brightness distribution of the second image 70. The projector 14 receives the signal of the second image 70, whose brightness distribution has been corrected, from the controller 16. The controller 16 acquires the second image 70 and corrects the brightness distribution of the second image 70 irrespective of the installation position or orientation of the projector 14.

Figure 6:
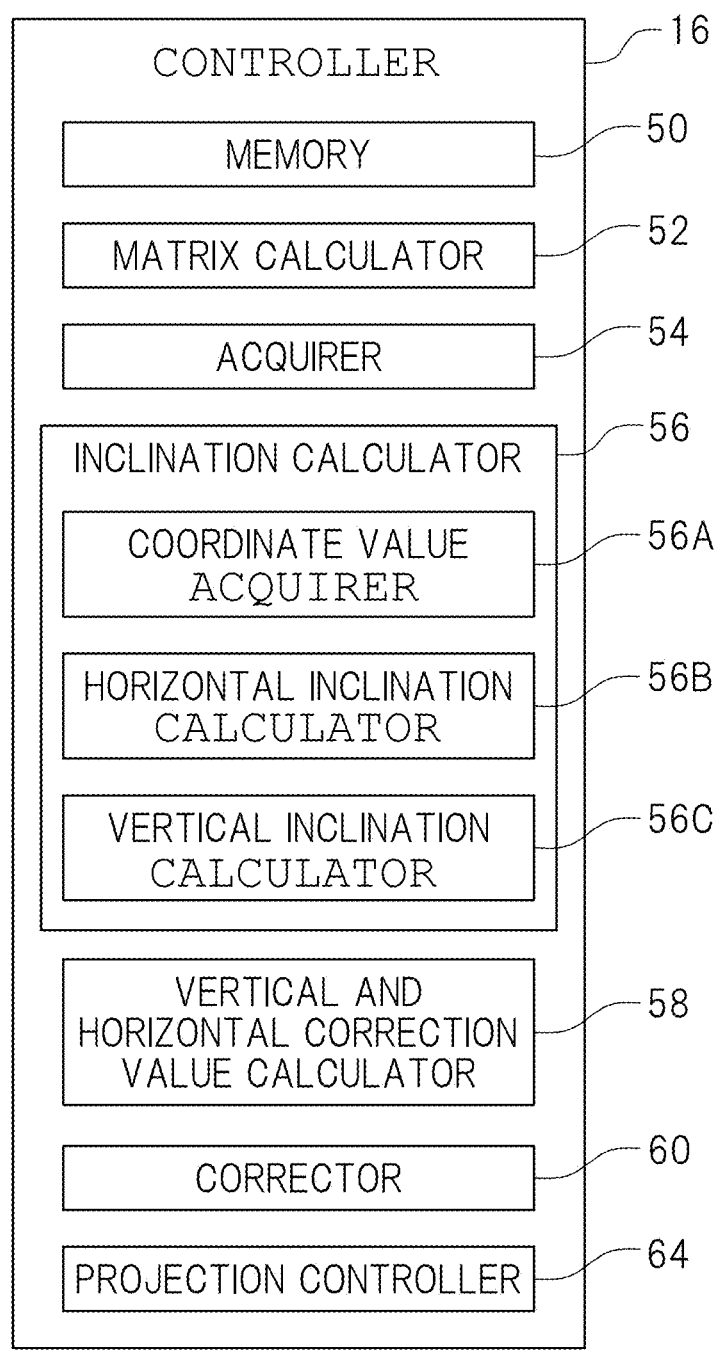
FIG. 6 is a block diagram of a controller according to a preferred embodiment of the present invention.
Figure 7:
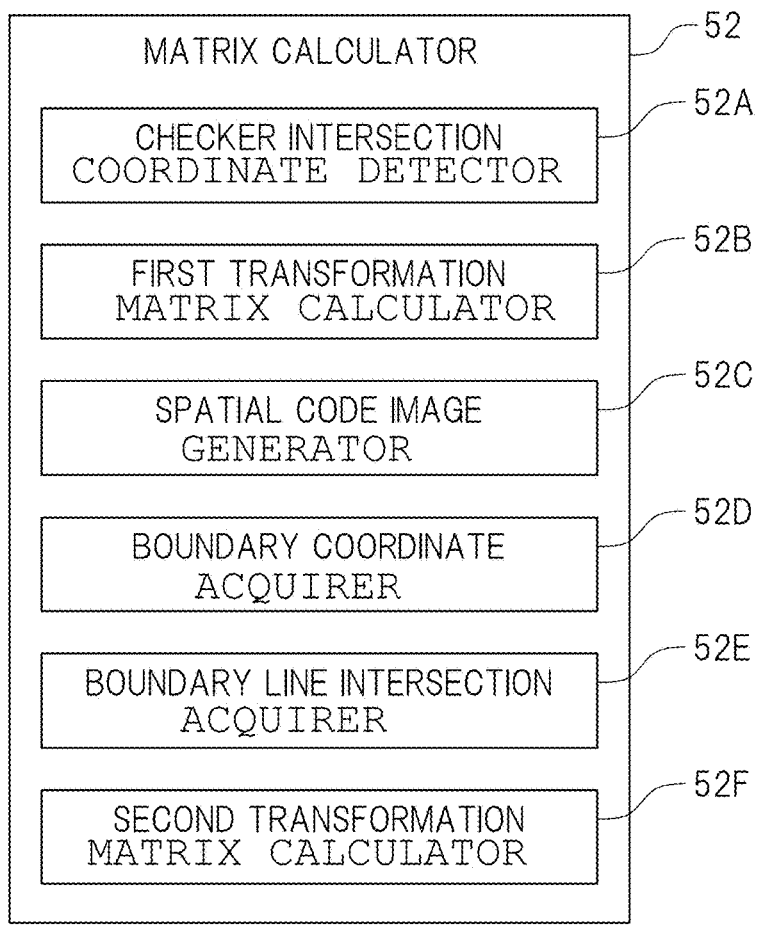
FIG. 7 is a block diagram of a matrix calculator according to a preferred embodiment of the present invention.

As illustrated in FIG. 6, the controller 16 according to this preferred embodiment preferably is configured or programmed to include the memory 50, a matrix calculator 52, an acquirer 54, an inclination calculator 56, a vertical and horizontal correction value calculator 58, a corrector 60, and a projection controller 64. The inclination calculator 56 preferably is configured or programmed to include a coordinate value acquirer 56A, a horizontal inclination calculator 56B, and a vertical inclination calculator 56C. As illustrated in FIG. 7, the matrix calculator 52 preferably includes a checker intersection coordinate detector 52A, a first transformation matrix calculator 52B, a spatial code image generator 52C, a boundary coordinate acquirer 52D, a boundary line intersection acquirer 52E, and a second transformation matrix calculator 52F.

The memory 50 stores a plurality of the first images 18. Each first image 18 may be generated by, for example, a personal computer separate from the controller 16. As illustrated in FIG. 3, the memory 50 stores coordinate values of an X-Y coordinate system that indicate four vertices of each first image 18 having a quadrangular or substantially quadrangular shape, i.e., a first vertex 19A, a second vertex 19B, a third vertex 19C, and a fourth vertex 19D. The memory 50 further stores checker intersection coordinates in a coordinate system of the printing region 12X in advance. The checker intersection coordinates indicate the locations of intersections of checkers adjacent to each other in the printing region 12X, with the intersections of the checkers equidistant from each other. The memory 50 further stores, in advance, the internal parameters calculated for the camera 15. The internal parameters for the camera 15 may be generated by, for example, a personal computer separate from the controller 16. The memory 50 further stores a third correction value β (which will be described below) in advance. When the first image 18 having a rectangular or square shape, or substantially rectangular or substantially square shape, is projected onto the entirety of the printing region 12X, the third correction value β is used to make uniform or substantially uniform the brightness distribution of the first image 18. The third correction value β may be an actual measured value or a theoretical value for the projector 14.

Figure 8:
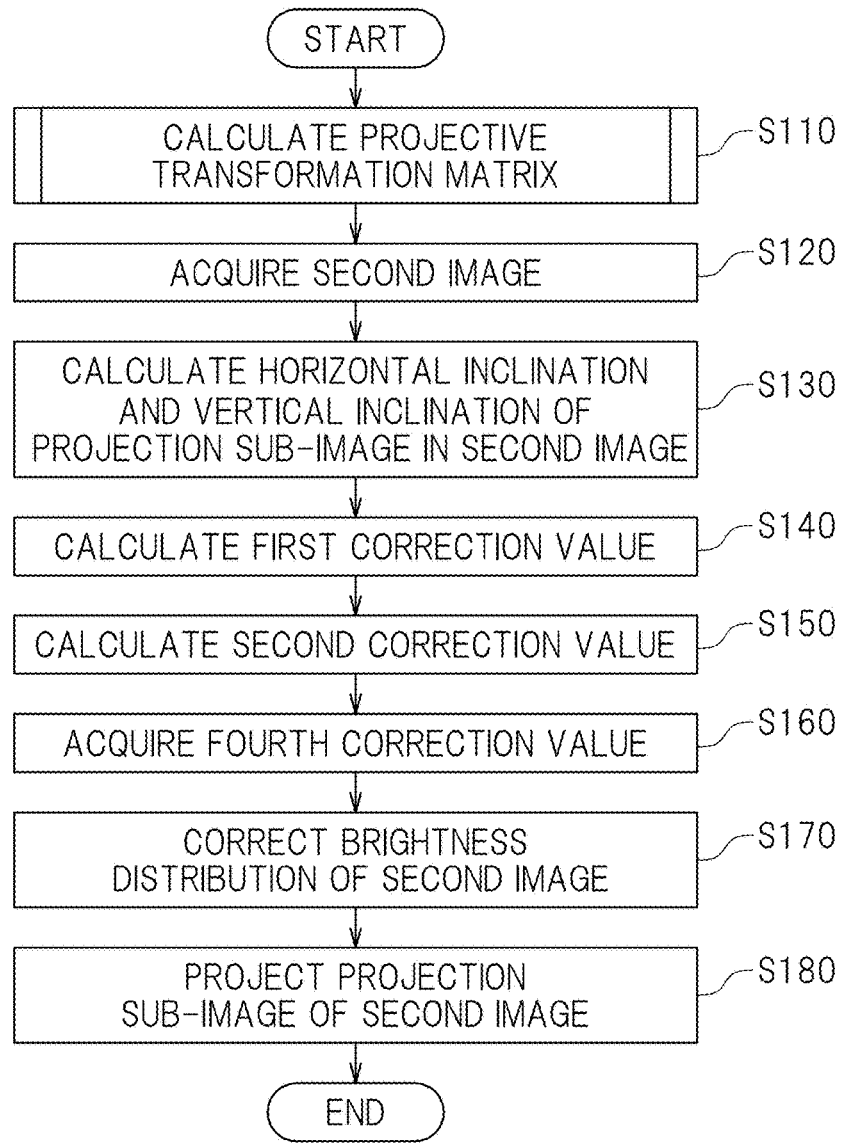
FIG. 8 is a flow chart illustrating a procedure for correcting the brightness distribution of a second image according to a preferred embodiment of the present invention.

FIG. 8 is a flow chart illustrating a procedure for correcting the brightness distribution of the second image 70. The procedure for correcting the brightness distribution of the second image 70 will be described below.

Figure 9:
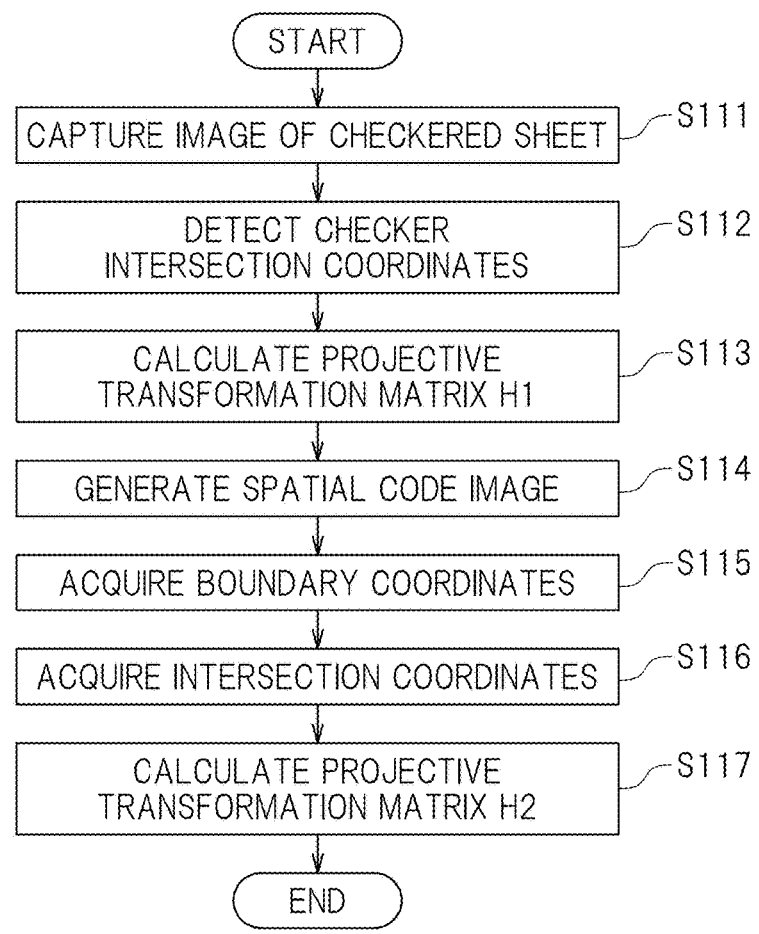
FIG. 9 is a flow chart illustrating a procedure for performing a projective transformation matrix calculating process.

First, in step S110, the matrix calculator 52 calculates the projective transformation matrix H2 by which the first image 18 is projectively transformed so that the first image 18 is projected onto the entirety of the printing region 12X. Note that the flow chart of FIG. 9 illustrates details of how the projective transformation matrix H2 is calculated in step S110.

In step S111, the controller 16 controls the camera 15 so that the camera 15 captures an image of the checkered sheet 32 disposed on the tank 12.

In step S112, the checker intersection coordinate detector 52A detects checker intersection coordinates in the image of the checkered sheet 32, which has been captured by the camera 15, with sub-pixel precision.

In step S113, the first transformation matrix calculator 52B calculates a projective transformation matrix H1 by which the checker intersection coordinates detected are projectively transformed into known coordinates in the printing region 12X. Specifically, in step S113, the first transformation matrix calculator 52B calculates the projective transformation matrix H1 by which checker intersection coordinates (xs, ys) detected in an image coordinate system are projectively transformed into checker intersection coordinates (xt, yt) in the coordinate system of the printing region 12X. The checker intersection coordinates in the coordinate system of the printing region 12X are stored in advance in the memory 50.

In step S114, the spatial code image generator 52C generates a spatial code image whose code value changes vertically and a spatial code image whose code value changes horizontally. Specifically, in step S114, the spatial code image generator 52C controls the projector 14 so that a positive image of an 8-bit vertical Gray code pattern (hereinafter referred to as a "vertical positive image"), a negative image of an 8-bit vertical Gray code pattern (hereinafter referred to as a "vertical negative image"), a positive image of an 8-bit horizontal Gray code pattern (hereinafter referred to as a "horizontal positive image"), and a negative image of an 8-bit horizontal Gray code pattern (hereinafter referred to as a "horizontal negative image") are each projected onto the checkered sheet 32 disposed on the tank 12. Each of the images projected is captured by the camera 15. The spatial code image generator 52C generates an 8-bit vertical binary image from differences between brightness values of the vertical positive image and brightness values of the vertical negative image. From the 8-bit vertical binary image, the spatial code image generator 52C generates a spatial code image whose code value changes horizontally (i.e., a gray scale image whose brightness value changes horizontally in the range of 0 to 255). The spatial code image generator 52C generates an 8-bit horizontal binary image from differences between brightness values of the horizontal positive image and brightness values of the horizontal negative image. From the 8-bit horizontal binary image, the spatial code image generator 52C generates a spatial code image whose code value changes vertically (i.e., a gray scale image whose brightness value changes vertically in the range of 0 to 255).

In step S115, the boundary coordinate acquirer 52D acquires, with sub-pixel precision, boundary coordinates of gray scale values in the spatial code images. Specifically, the boundary coordinate acquirer 52D determines, with sub-pixel precision, intersections of brightness profiles in the vertical positive image and the vertical negative image. These intersections correspond to boundary coordinates of code values determined with sub-pixel precision in the spatial code image (see FIG. 10) whose code value changes horizontally. The boundary coordinate acquirer 52D determines, with sub-pixel precision, intersections of brightness profiles in the horizontal positive image and the horizontal negative image. These intersections correspond to boundary coordinates of code values determined with sub-pixel precision in the spatial code image (see FIG. 10) whose code value changes vertically.

Figure 10:
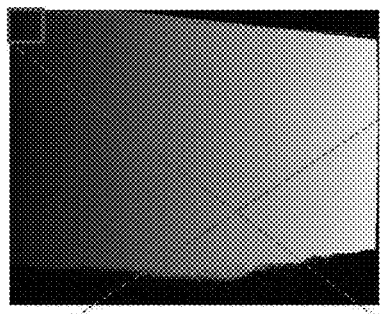
FIG. 10 is a schematic representation illustrating intersections of boundary lines in a spatial code image whose code value changes horizontally with boundary lines in a spatial code image whose code value changes vertically.
Figure 10:
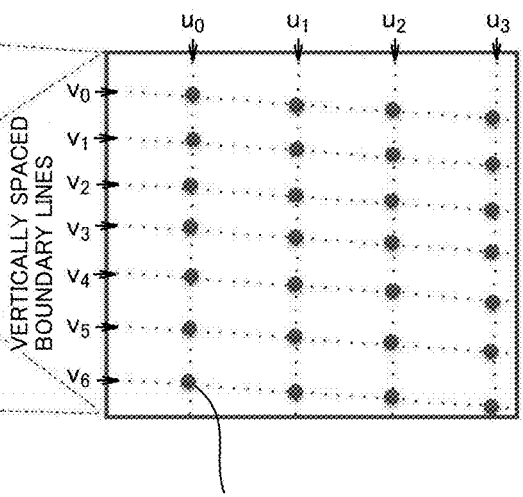
Figure 10:

In step S116, the boundary line intersection acquirer 52E acquires boundary lines each connecting points indicated by boundary coordinates associated with the same code value in each of the spatial code image whose code value changes vertically and the spatial code image whose code value changes horizontally. Suppose that when a spatial code image includes a "code value n" and a "code value n+1" adjacent to the "code value n", the spatial code image includes a "boundary line n". In this case, boundary lines 0 to n are obtained in the spatial code image whose code value changes horizontally, where n=0 to 254 (maximum value). These boundary lines are horizontally spaced. Furthermore, boundary lines 0 to n are obtained in the spatial code image whose code value changes vertically, where n=0 to 254 (maximum value). These boundary lines are vertically spaced. For example, when the projector 14 is manufactured to specifications that include 854 by 480 pixels (with an input image size of 1366 by 768 pixels), boundary lines 0 to n (where n=0 to 226) are obtained in the spatial code image whose code value changes horizontally, and boundary lines 0 to n (where n=0 to 254) are obtained in the spatial code image whose code value changes vertically. The spatial code image whose code value changes vertically is combined with the spatial code image whose code value changes horizontally, thus acquiring coordinates C (see FIG. 10) of intersections of the boundary lines in the spatial code image whose code value changes horizontally (i.e., the horizontally spaced boundary lines) with the boundary lines in the spatial code image whose code value changes vertically (i.e., the vertically spaced boundary lines). In FIG. 10, the horizontally spaced boundary lines are indicated by $U_0$ to $U_n$ (where n=0 to 226), and the vertically spaced boundary lines are indicated by $V_0$ to $V_n$ (where n=0 to 254).

Figure 11:
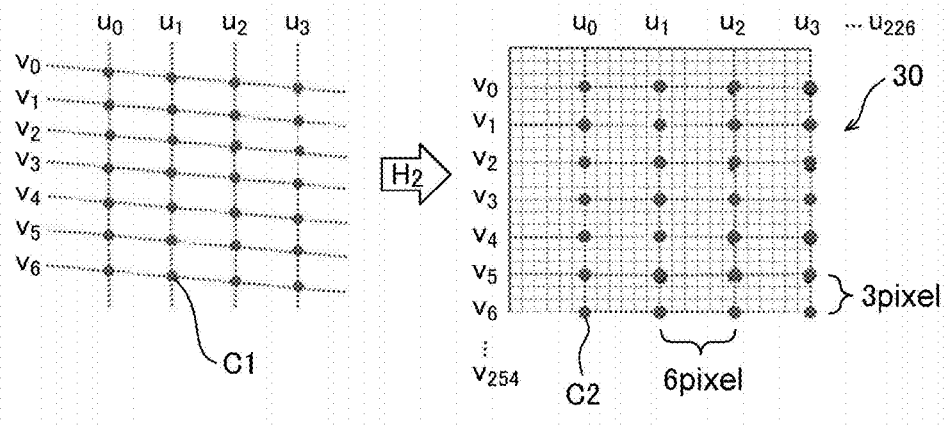
FIG. 11 is a schematic representation illustrating how intersection coordinates that have been transformed using a projective transformation matrix H1 are further transformed using a projective transformation matrix H2, so that intersections are arranged ideally in a printing region.

In step S117, the second transformation matrix calculator 52F transforms the intersection coordinates C using the projective transformation matrix H1. Then, the second transformation matrix calculator 52F calculates the projective transformation matrix H2 by which the first image 18 is projectively transformed so that the intersection coordinates C transformed are presented on the entirety of the printing region 12X. Specifically, in step S117, the second transformation matrix calculator 52F transforms the intersection coordinates C into first intersection coordinates C1 (see FIG. 11) in the coordinate system of the printing region 12X using the projective transformation matrix H1. Then, as illustrated in FIG. 11, the second transformation matrix calculator 52F calculates the projective transformation matrix H2 by which the first intersection coordinates C1 obtained are transformed into second intersection coordinates C2 of boundary lines in a normal image 30 in which the boundary lines are arranged in a grid pattern in an image to be input to the projector 14.

When the number of pixels of the projector 14 is "X" by "Y" pixels, the second intersection coordinates C2 of the boundary lines in the normal image 30 are calculated as follows.

Instep S117, the second transformation matrix calculator 52F calculates, for "Y" (i.e., the number of pixels for a short side of the image to be input to the projector 14), intervals (i.e., the number of pixels) at which the vertically spaced boundary lines $V_0$ to $V_n$ are arranged equidistantly. Specifically, the value of "j" obtained when the value of $\{Y+(j-1)\}/j$ is closest to the number of the vertically spaced boundary lines $V_0$ to $V_n$ is determined to be an interval between the boundary lines adjacent to each other. Note that "j" is a positive integer. For example, when the input image size of the projector 14 is 1366 by 768 pixels, the number of pixels for "Y" is "768", and the number of the vertically spaced boundary lines $V_0$ to $V_n$ is 255. Thus, the value of "j" by which the value of $\{768+(j-1)\}/j$ is closest to 255 is determined. In this case, the value of "j" is three, so that adjacent ones of the vertically spaced boundary lines $V_0$ to $V_n$ are arranged at an interval of three pixels in the normal image 30.

Subsequently, the second transformation matrix calculator 52F calculates, for "X" (i.e., the number of pixels for a long side of the image to be input to the projector 14), intervals at which the horizontally spaced boundary lines $U_0$ to $U_n$ are arranged equidistantly. Specifically, the value of "k" obtained when the value of $\{X+(k-1)\}/k$ is closest to the number of the horizontally spaced boundary lines $U_0$ to $U_n$ is determined to be an interval between the boundary lines adjacent to each other. Note that "k" is a positive integer. For example, when the input image size of the projector 14 is 1366 by 768 pixels, the number of pixels for "X" is 1366, and the number of the horizontally spaced boundary lines $U_0$ to $U_n$ is 227. Thus, the value of "k" by which the value of $\{1366+(k-1)\}/k$ is closest to 227 is determined. In this case, the value of "k" is six, so that adjacent ones of the horizontally spaced boundary lines $U_0$ to $U_n$ are arranged at an interval of six pixels in the normal image 30.

The processes thus described provide the normal image 30 in which the vertically spaced boundary lines $V_0$ to $V_n$ and the horizontally spaced boundary lines $U_0$ to $U_n$ are arranged in a grid pattern. Then, the second transformation matrix calculator 52F calculates the second intersection coordinates C2 of the boundary lines $V_0$ to $V_n$ and the boundary lines $U_0$ to $U_n$ in the normal image 30 obtained. In step S117, the second transformation matrix calculator 52F calculates the projective transformation matrix H2 by which image coordinates (xs, ys) equivalent to the first intersection coordinates C1 of the vertically spaced boundary lines $V_0$ to $V_n$ and the horizontally spaced boundary lines $U_0$ to $U_n$ in the combined spatial code image are projectively transformed into image coordinates (xt, yt) equivalent to the second intersection coordinates C2 of the boundary lines in the normal image 30. The projective transformation matrix H2 calculated is stored in the memory 50.

Figure 12:
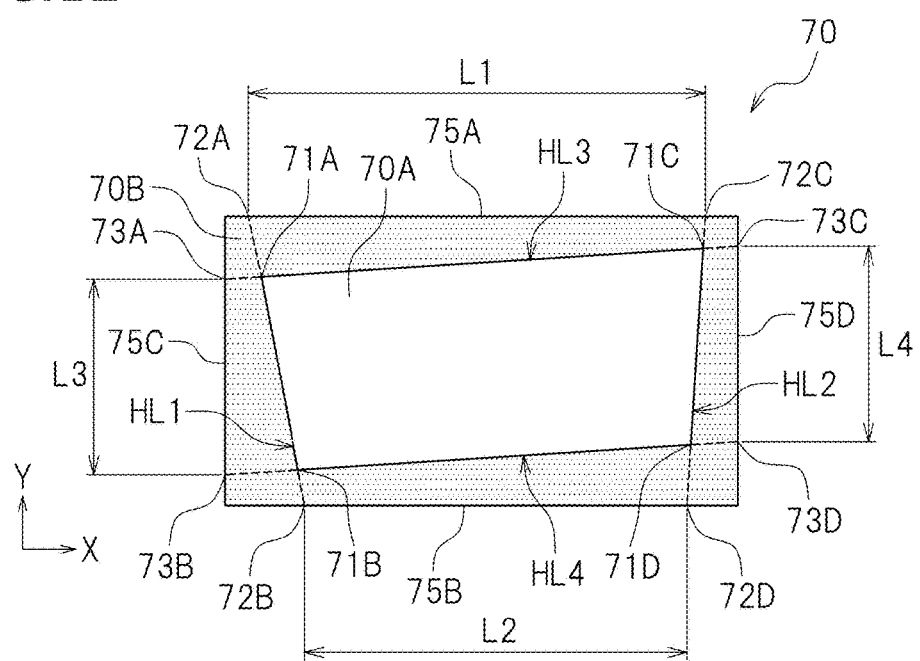
FIG. 12 is a schematic diagram illustrating the second image input to the projector according to a preferred embodiment of the present invention.

In step S120, the acquirer 54 transforms the first image 18 using the projective transformation matrix H2 so as to acquire the second image 70 (see FIG. 12). The second image 70 acquired is output to and stored in the memory 50. As illustrated in FIG. 12, the second image 70 preferably includes a projection sub-image 70A and a projection sub-image 70B each having a quadrangular or substantially quadrangular shape.

In step S130, the inclination calculator 56 calculates a horizontal (i.e., X-axis) inclination $a_x$ and a vertical (i.e., Y-axis) inclination $a_y$ of the projection sub-image 70A in the second image 70. Specifically, as illustrated in FIG. 12, the coordinate value acquirer 56A acquires coordinate values of four vertices of the quadrangular projection sub-image 70A of the second image 70, i.e., a first vertex 71A, a second vertex 71B, a third vertex 71C, and a fourth vertex 71D, in the X-Y coordinate system. Using the projective transformation matrix H2, the coordinate value acquirer 56A transforms the coordinate values of the first to fourth vertices 19A to 19D (see FIG. 3) of the first image 18 in the X-Y coordinate system, which are stored in the memory 50, thus acquiring the coordinate values of the first to fourth vertices 71A to 71D of the projection sub-image 70A in the X-Y coordinate system.

The horizontal inclination calculator 56B calculates the horizontal inclination $a_x$ of the projection sub-image 70A. Specifically, the horizontal inclination calculator 56B calculates coordinate values of a first intersection 72A that is the intersection of a first vertical end (i.e., a first side) 75A of the second image 70 and a first straight line HL1 passing through the first and second vertices 71A and 71B of the projection sub-image 70A. The horizontal inclination calculator 56B further calculates coordinate values of a second intersection 72B that is the intersection of the first straight line HL1 and a second vertical end (i.e., a second side) 75B of the second image 70. The horizontal inclination calculator 56B further calculates coordinate values of a third intersection 72C that is the intersection of the first vertical end (i.e., the first side) 75A of the second image 70 and a second straight line HL2 passing through the third and fourth vertices 71C and 71D. The horizontal inclination calculator 56B further calculates coordinate values of a fourth intersection 72D that is the intersection of the second straight line HL2 and the second vertical end (i.e., the second side) 75B of the second image 70. The horizontal inclination calculator 56B further calculates a first length L1 between the first intersection 72A and the third intersection 72C. The horizontal inclination calculator 56B further calculates a second length L2 between the second intersection 72B and the fourth intersection 72D. The horizontal inclination calculator 56B then calculates the ratio of the second length L2 to the first length L1. This ratio is determined to be the horizontal inclination $a_x$. The horizontal inclination $a_x$ is given by Eq. 1 below.

Eq. 1

$$a_x = \frac{L_2}{L_1} \quad (1)$$

The vertical inclination calculator 56C calculates the vertical inclination $a_y$ of the projection sub-image 70A. Specifically, the vertical inclination calculator 56C calculates coordinate values of a fifth intersection 73A that is the intersection of a first horizontal end (i.e., a third side) 75C of the second image 70 and a third straight line HL3 passing through the first and third vertices 71A and 71C. The vertical inclination calculator 56C further calculates coordinate values of a sixth intersection 73C that is the intersection of the third straight line HL3 and a second horizontal end (i.e., a fourth side) 75D of the second image 70. The vertical inclination calculator 56C further calculates coordinate values of a seventh intersection 73B that is the intersection of the first horizontal end (i.e., the third side) 75C of the second image 70 and a fourth straight line HL4 passing through the second and fourth vertices 71B and 71D. The vertical inclination calculator 56C further calculates coordinate values of an eighth intersection 73D that is the intersection of the fourth straight line HL4 and the second horizontal end (i.e., the fourth side) 75D of the second image 70. The vertical inclination calculator 56C further calculates a third length L3 between the fifth intersection 73A and the seventh intersection 73B. The vertical inclination calculator 56C further calculates a fourth length L4 between the sixth intersection 73C and the eighth intersection 73D. The vertical inclination calculator 56C then calculates the ratio of the fourth length L4 to the third length L3. This ratio is determined to be the vertical inclination $a_y$. The vertical inclination $a_y$ is given by Eq. 2 below.

Eq. 2

$$a_y = \frac{L_4}{L_3} \quad (2)$$

In step S140, the vertical and horizontal correction value calculator 58 calculates, based on the horizontal inclination $a_x$, a first correction value $\alpha_x$ (r, c) by which the horizontal brightness distribution of the first image 18 is corrected. The first correction value $\alpha_x$ (r, c) is used to make uniform or substantially uniform the horizontal brightness distribution of the first image 18 obtained when the first image 18 is transformed using the projective transformation matrix H2. The first correction value $\alpha_x$ (r, c) is given by Eq. 3 below. In Eq. 3, R represents a constant expressed as r−1. The first correction value $\alpha_x$ (r, c) is provided using a table with r rows and c columns. Table 1 is a table with seven rows and seven columns and provides exemplary first correction values $\alpha_x$ (7, 7).

Eq. 3

$$\alpha_x(r, c) = \left(1 - r \times \left(\frac{1 - a_x}{R}\right)\right)^2 \quad (3)$$

TABLE 1

| | | | | | | |
|---|---|---|---|---|---|---|
| 1.00 | 1.00 | 1.00 | 1.00 | 1.00 | 1.00 | 1.00 |
| 0.93 | 0.93 | 0.93 | 0.93 | 0.93 | 0.93 | 0.93 |
| 0.87 | 0.87 | 0.87 | 0.87 | 0.87 | 0.87 | 0.87 |
| 0.81 | 0.81 | 0.81 | 0.81 | 0.81 | 0.81 | 0.81 |
| 0.75 | 0.75 | 0.75 | 0.75 | 0.75 | 0.75 | 0.75 |
| 0.69 | 0.69 | 0.69 | 0.69 | 0.69 | 0.69 | 0.69 |
| 0.63 | 0.63 | 0.63 | 0.63 | 0.63 | 0.63 | 0.63 |

In step S150, the vertical and horizontal correction value calculator 58 calculates, based on the vertical inclination $a_y$, a second correction value $\alpha_y$ (r, c) by which the vertical brightness distribution of the first image 18 is corrected. The second correction value $\alpha_y$ (r, c) is used to make uniform or substantially uniform the vertical brightness distribution of the first image 18 obtained when the first image 18 is transformed using the projective transformation matrix H2. The second correction value $\alpha_y$ (r, c) is given by Eq. 4 below. In Eq. 4, S represents a constant expressed as c−1. The second correction value $\alpha_y$ (r, c) is provided using a table with r rows and c columns. Table 2 is a table with seven rows and seven columns and provides exemplary second correction values $\alpha_y$ (7, 7). In this preferred embodiment, step S150 is performed following step S140. In one example, step S140 may be performed following step S150. In another example, step S140 and step S150 may be performed simultaneously.

Eq. 4

$$\alpha_y(r, c) = \left(1 - c \times \left(\frac{1 - a_y}{S}\right)\right)^2 \quad (4)$$

TABLE 2

| | | | | | | |
|---|---|---|---|---|---|---|
| 1.00 | 1.00 | 1.00 | 1.00 | 1.00 | 1.00 | 1.00 |
| 1.00 | 1.00 | 1.00 | 1.00 | 1.00 | 1.00 | 1.00 |
| 1.00 | 1.00 | 1.00 | 1.00 | 1.00 | 1.00 | 1.00 |
| 1.00 | 1.00 | 1.00 | 1.00 | 1.00 | 1.00 | 1.00 |
| 1.00 | 1.00 | 1.00 | 1.00 | 1.00 | 1.00 | 1.00 |
| 1.00 | 1.00 | 1.00 | 1.00 | 1.00 | 1.00 | 1.00 |
| 1.00 | 1.00 | 1.00 | 1.00 | 1.00 | 1.00 | 1.00 |

In step S160, the corrector 60 multiplies the first correction value $\alpha_x$ (r, c) by the second correction value $\alpha_y$ (r, c) and by the third correction value β (r, c), thus acquiring a fourth correction value γ (r, c). The third correction value β (r, c) is used to make uniform or substantially uniform the brightness distribution of the first image 18 when the first image 18 having a rectangular or square shape is projected onto the entirety of the printing region 12X of the tank 12. The third correction value β (r, c) is stored in advance in the memory 50. r represents the number of rows for the first image 18. c represents the number of columns for the first image 18. The third correction value β (r, c) is provided using a table with r rows and c columns. Table 3 is a table with seven rows and seven columns and provides exemplary third correction values β (7, 7).

TABLE 3

| 0.44 | 0.44 | 0.45 | 0.44 | 0.44 | 0.42 | 0.40 |
|------|------|------|------|------|------|------|
| 0.91 | 0.92 | 0.93 | 0.92 | 0.89 | 0.84 | 0.77 |
| 0.95 | 0.96 | 0.97 | 0.97 | 0.95 | 0.88 | 0.81 |
| 0.96 | 0.97 | 0.99 | 0.98 | 0.96 | 0.90 | 0.81 |
| 0.98 | 0.98 | 0.99 | 0.98 | 0.97 | 0.91 | 0.79 |
| 0.99 | 0.99 | 1.00 | 0.98 | 0.97 | 0.91 | 0.77 |
| 1.00 | 1.00 | 1.00 | 0.98 | 0.96 | 0.90 | 0.74 |

In step S170, the corrector 60 corrects the brightness distribution of the second image 70 using the fourth correction value γ (r, c). In other words, in step S170, the corrector 60 makes uniform or substantially uniform the brightness distribution of the second image 70 using the fourth correction value γ (r, c). Specifically, the corrector 60 multiplies the gray level of the second image 70 by the fourth correction value γ (r, c) in view of the association between the brightness and gray level of the second image 70, thus making uniform or substantially uniform the brightness distribution of the second image 70. An inter-table numerical value for the fourth correction value γ (r, c) is appropriately estimated using, for example, bi-linear interpolation. The second image 70 whose brightness distribution has been corrected using the fourth correction value γ (r, c) is output to and stored in the memory 50. Table 4 is a table with seven rows and seven columns and provides exemplary fourth correction values γ (7, 7). Note that the maximum value in Table 4 is 100.

TABLE 4

| 50 | 50 | 51 | 51 | 51 | 49 | 45 |
|----|----|----|----|----|----|----|
| 97 | 99 | 100 | 98 | 96 | 89 | 82 |
| 94 | 95 | 97 | 96 | 94 | 88 | 80 |
| 89 | 90 | 91 | 90 | 89 | 83 | 75 |
| 84 | 84 | 85 | 84 | 83 | 78 | 68 |
| 78 | 78 | 79 | 78 | 76 | 72 | 61 |
| 73 | 73 | 73 | 71 | 70 | 65 | 54 |

In step S160, the corrector 60 may normalize (or change) the fourth correction value γ (r, c) so that light to be applied to the darkest portion of the second image 70 is brightest. For example, the corrector 60 may normalize (or change) the fourth correction value γ (r, c) so that the amount of light to be applied to the darkest portion of the second image 70 is 100. In this case, in step S170, the corrector 60 makes uniform or substantially uniform the brightness distribution of the second image 70 using the fourth correction value γ (r, c) normalized (or changed). The second image 70 whose brightness distribution has been corrected using the fourth correction value γ (r, c) normalized (or changed) is output to and stored in the memory 50. Table 5 provides the fourth correction values γ (7, 7) obtained by normalizing (or changing) the fourth correction values γ (7, 7) in Table 4 so that the amount of light to be applied to the darkest portion of the brightness distribution of the second image 70 is 100.

TABLE 5

| 95 | 95 | 94 | 94 | 94 | 96 | 100 |
|----|----|----|----|----|----|-----|
| 48 | 46 | 4  | 47 | 49 | 56 | 63  |
| 51 | 50 | 48 | 49 | 51 | 57 | 65  |
| 56 | 55 | 54 | 55 | 56 | 63 | 70  |
| 61 | 61 | 60 | 61 | 62 | 67 | 77  |
| 67 | 67 | 66 | 67 | 69 | 73 | 84  |
| 72 | 72 | 72 | 74 | 75 | 80 | 91  |

In step S180, the projection controller 64 controls the projector 14 so that the projector 14 projects the second image 70, whose brightness distribution has been corrected, onto the tank 12. Specifically, the projection controller 64 causes the projector 14 to project the projection sub-image 70A of the second image 70, whose brightness distribution has been corrected, onto the entirety of the printing region 12X of the tank 12. The projection sub-image 70A of the second image 70 projected onto the printing region 12X has reduced brightness variations without distortion. In this preferred embodiment, the projector 14 does not project the projection sub-image 70B onto the tank 12. Alternatively, the projector 14 may project the projection sub-image 70B, which is presented as a black image, onto the tank 12.

When the corrector 60 normalizes the fourth correction value γ (r, c) in step S160, the projection controller 64 controls the projector 14 so that the projector 14 projects the second image 70, whose brightness distribution has been corrected using the fourth correction value γ (r, c) normalized, onto the tank 12 in step S180. Specifically, in this case, the projection controller 64 causes the projector 14 to project the projection sub-image 70A of the second image 70, whose brightness distribution has been corrected using the fourth correction value γ (r, c) normalized, onto the entirety of the printing region 12X of the tank 12.

The method thus described corrects the brightness distribution of the second image 70 and enables the second image 70, whose brightness variations have been reduced, to be projected onto the tank 12 irrespective of the installation position or orientation of the projector 14.

If the first image 18 projected from the projector 14 is distorted in the tank 12, this preferred embodiment will enable the second image 70, which is obtained by correcting the first image 18, to be projected onto the tank 12 from the projector 14 as described above. The first image 18 is projectively transformed into the second image 70 using the projective transformation matrix H2. Thus, the projection sub-image 70A of the second image 70 is presented on the entirety of the printing region 12X of the tank 12. The brightness distribution of the second image 70, which has been projectively transformed from the first image 18, is corrected using the fourth correction value γ (r, c). This correction reduces brightness variations of the projection sub-image 70A of the second image 70 to be projected from the projector 14, thus making uniform or substantially uniform the brightness values of the projection sub-image 70A to be projected onto the tank 12. Consequently, this preferred embodiment prevents a situation in which portions of the photo-curable resin 23 onto which images are projected are cured to varying degrees. Unlike conventional three-dimensional printing apparatuses, the three-dimensional printing apparatus 10 needs no mechanism to adjust the position and/or orientation of the projector 14, so that the overall size of the three-dimensional printing apparatus 10 does not increase. Eliminating such a mechanism reduces the number of components and manufacturing cost of the three-dimensional printing apparatus 10.

In this preferred embodiment, the inclination calculator 56 preferably includes the horizontal inclination calculator 56B and the vertical inclination calculator 56C. Thus, as illustrated in FIG. 12, the horizontal inclination $a_x$ and the vertical inclination $a_y$ of the projection sub-image 70A in the second image 70 are reliably calculated.

In this preferred embodiment, the corrector 60 may normalize the fourth correction value γ (r, c) so that light to be applied to the darkest portion of the second image 70 is brightest, and may correct the brightness distribution of the second image 70 using the fourth correction value γ (r, c) normalized. This reduces brightness variations of the second image 70 while increasing the brightness values of the second image 70 as a whole.

In this preferred embodiment, the matrix calculator 52 calculates the projective transformation matrix H2 using the image of the checkered sheet 32 captured by the camera 15. This facilitates calculation of the projective transformation matrix H2.

If the projector 14 is disposed at any position below the tank 12, this preferred embodiment will correct distortion and brightness distribution of the first image 18 projected onto the tank 12. Thus, the flexibility of location of the projector 14 increases. This eliminates the need for a component, such as a cover or a mirror, which prevents adhesion of the photo-curable resin 23 to the projector 14.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus that cures liquid photo-curable resin to sequentially stack resin layers each having a predetermined cross-sectional shape to print a three-dimensional object, the apparatus comprising:
    a tank storing the liquid photo-curable resin and including a printing region in which the three-dimensional object is to be printed;
    a projector to project a first image having a quadrangular or substantially quadrangular shape onto the tank; and
    a controller to control the projector; wherein
    the controller includes:
        a matrix calculator to calculate a projective transformation matrix by which the first image is projectively transformed so that the first image is presented on an entirety of the printing region;
        an acquirer to transform the first image using the projective transformation matrix, thus acquiring a second image obtained by correction of the first image, the second image including a projection sub-image having a quadrangular or substantially quadrangular shape;
        an inclination calculator to calculate a horizontal inclination and a vertical inclination of the projection sub-image in the second image;
        a vertical and horizontal correction value calculator to calculate, based on the horizontal inclination, a first correction value by which a horizontal brightness distribution of the first image is corrected, and to calculate, based on the vertical inclination, a second correction value by which a vertical brightness distribution of the first image is corrected;
        a memory to store a third correction value by which a brightness distribution of the first image projected onto the entirety of the printing region is corrected, the first image projected having a rectangular, substantially rectangular, square or substantially square shape;
        a corrector to correct a brightness distribution of the second image using a fourth correction value calculated based on the first correction value, the second correction value, and the third correction value; and
        a projection controller to control the projector so that the projection sub-image of the second image whose brightness distribution has been corrected is projected from the projector onto the tank.

2. The three-dimensional printing apparatus according to claim 1, wherein the inclination calculator includes:
    a coordinate value acquirer to acquire coordinate values of four vertices of the projection sub-image in the second image, the four vertices including a first vertex, a second vertex, a third vertex, and a fourth vertex;
    a horizontal inclination calculator to calculate:
        coordinate values of a first intersection that is an intersection of a first vertical end of the second image and a first straight line passing through the first and second vertices;
        coordinate values of a second intersection that is an intersection of the first straight line and a second vertical end of the second image;
        coordinate values of a third intersection that is an intersection of the first vertical end of the second image and a second straight line passing through the third and fourth vertices;
        coordinate values of a fourth intersection that is an intersection of the second straight line and the second vertical end of the second image;
        a first length between the first intersection and the third intersection;
        a second length between the second intersection and the fourth intersection; and
        a ratio of the second length to the first length, the ratio being the horizontal inclination of the projection sub-image; and
    a vertical inclination calculator to calculate:
        coordinate values of a fifth intersection that is an intersection of a first horizontal end of the second image and a third straight line passing through the first and third vertices;
        coordinate values of a sixth intersection that is an intersection of the third straight line and a second horizontal end of the second image;
        coordinate values of a seventh intersection that is an intersection of the first horizontal end of the second image and a fourth straight line passing through the second and fourth vertices;
        coordinate values of an eighth intersection that is an intersection of the fourth straight line and the second horizontal end of the second image;
        a third length between the fifth intersection and the seventh intersection;
        a fourth length between the sixth intersection and the eighth intersection; and
        a ratio of the fourth length to the third length, the ratio being the vertical inclination of the projection sub-image.

3. The three-dimensional printing apparatus according to claim 1, wherein the corrector normalizes the fourth correction value so that light to be applied to a darkest portion of the second image is brightest, and corrects the brightness distribution of the second image using the fourth correction value normalized.

4. The three-dimensional printing apparatus according to claim 1, further comprising:
- an image capturing device to capture an image of the tank; and
- a checkered sheet disposed on the tank; wherein
- the projector projects the first image onto the checkered sheet;
- the image capturing device captures an image of the checkered sheet onto which the first image is projected; and
- the matrix calculator calculates the projective transformation matrix using the image of the checkered sheet captured by the image capturing device.

5. The three-dimensional printing apparatus according to claim 1, further comprising a holder disposed above the tank, the holder being lowerable such that when the holder is lowered, the holder is immersed in the photo-curable resin in the tank, the holder being raisable such that when the holder is raised, the holder lifts a portion of the photo-curable resin cured by exposure to light, wherein the projector is disposed below the tank.

* * * * *